(12) United States Patent
Cheng et al.

(10) Patent No.: US 11,611,455 B2
(45) Date of Patent: Mar. 21, 2023

(54) METHOD AND DEVICE FOR COMMUNICATION DETECTION AND AIR CONDITIONER

(71) Applicants: QINGDAO HAIER AIR-CONDITIONING ELECTRONIC CO., LTD., Shandong (CN); HAIER SMART HOME CO., LTD., Shandong (CN)

(72) Inventors: Shaojiang Cheng, Shandong (CN); Defang Guo, Shandong (CN); Bin Shi, Shandong (CN); Baitian Zhuo, Shandong (CN); Jun Wang, Shandong (CN); Ruigang Zhang, Shandong (CN)

(73) Assignees: QINGDAO HAIER AIR-CONDITIONING ELECTRONIC CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 36 days.

(21) Appl. No.: 17/297,544

(22) PCT Filed: May 15, 2020

(86) PCT No.: PCT/CN2020/090426
§ 371 (c)(1),
(2) Date: May 27, 2021

(87) PCT Pub. No.: WO2020/238648
PCT Pub. Date: Dec. 3, 2020

(65) Prior Publication Data
US 2022/0029860 A1    Jan. 27, 2022

(30) Foreign Application Priority Data
May 31, 2019    (CN) .......................... 201910471269.0

(51) Int. Cl.
H04L 25/02    (2006.01)
H04L 12/28    (2006.01)
F24F 11/56    (2018.01)

(52) U.S. Cl.
CPC .......... *H04L 25/0216* (2013.01); *F24F 11/56* (2018.01); *H04L 12/2803* (2013.01)

(58) Field of Classification Search
CPC .................................................. H04L 25/0216
See application file for complete search history.

(56) References Cited

U.S. PATENT DOCUMENTS

| 7,817,585 B2 * | 10/2010 | Barrett | G09G 5/008 |
| | | | 379/229 |
| 8,369,394 B2 * | 2/2013 | Belge | H04B 3/493 |
| | | | 379/27.01 |

(Continued)

FOREIGN PATENT DOCUMENTS

| AU | 2005208725 A1 * | 8/2006 | ............ F24F 11/006 |
| CN | 101635694 A    * | 1/2010 | |

(Continued)

OTHER PUBLICATIONS

K. Sugihara, S. Kobatake, H. Shirai, H. Oowada and K. Yoshitomi, "HBS-standard-compatible home bus protocol controller," in IEEE Transactions on Consumer Electronics, vol. 35, No. 3, pp. 605-607, Aug. 1989, doi: 10.1109/30.44324.*

(Continued)

*Primary Examiner* — Berhanu Tadese
(74) *Attorney, Agent, or Firm* — Calfee, Halter & Griswold LLP

(57) ABSTRACT

The present application relates to a method for communication detection. The method comprises: determining a length level of a communication link according to a time length of pulse data during transmission of data over the communication link, and determining a detection time point (Continued)

according to the length level of the communication link. The length level of the communication link is determined according to the time length of pulse data during transmission of data over the communication link, and then the detection time point of the data is confirmed, thereby realizing dynamic determination of the detection time point of data according to the time length of the pulse data, and data waveform attenuation caused by an excessively long distance is avoided by means of automatic adjustment of the detection time point, so that the correctness of data detection is ensured, and the stability of long-distance homebus communication is improved.

18 Claims, 3 Drawing Sheets

(56) References Cited

U.S. PATENT DOCUMENTS

| | | | | |
|---|---|---|---|---|
| 8,553,750 | B2 * | 10/2013 | Belge | H04L 43/50 |
| | | | | 379/27.01 |
| 9,580,858 | B2 * | 2/2017 | Maekawa | H02M 7/53873 |
| 9,729,362 | B1 * | 8/2017 | Ralph | H04L 27/0014 |
| 9,967,024 | B1 | 5/2018 | Martin | |
| 10,623,292 | B2 * | 4/2020 | Shirasuka | H04L 43/16 |
| 10,880,213 | B2 * | 12/2020 | Ostwal | H04W 52/0229 |
| 2005/0159846 | A1 * | 7/2005 | Van Ostrand | F24F 11/30 |
| | | | | 700/276 |
| 2005/0188706 | A1 | 9/2005 | Tokushige et al. | |
| 2017/0103312 | A1 * | 4/2017 | Henry | G06N 3/0445 |
| 2018/0027203 | A1 * | 1/2018 | Clay | H04N 21/42204 |
| | | | | 348/734 |
| 2021/0140669 | A1 * | 5/2021 | Wang | F24F 11/56 |
| 2022/0019249 | A1 * | 1/2022 | Petry | G05D 7/0635 |
| 2022/0021564 | A1 * | 1/2022 | Cheng | H04L 25/0202 |
| 2022/0029860 | A1 * | 1/2022 | Cheng | F24F 11/30 |
| 2022/0078048 | A1 * | 3/2022 | Wang | H04L 25/0216 |

FOREIGN PATENT DOCUMENTS

| | | | | |
|---|---|---|---|---|
| CN | 101706144 | A | 5/2010 | |
| CN | 101706144 | A * | 5/2010 | |
| CN | 101873155 | | 10/2010 | |
| CN | 103453619 | A * | 12/2013 | F24F 11/006 |
| CN | 103471201 | | 12/2013 | |
| CN | 104076328 | A * | 10/2014 | G01S 5/0252 |
| CN | 104247238 | A * | 12/2014 | H02M 1/12 |
| CN | 103453619 | B * | 11/2015 | F24F 11/006 |
| CN | 105783194 | | 7/2016 | |
| CN | 106093850 | | 11/2016 | |
| CN | 104076328 | B * | 12/2016 | G01S 5/0252 |
| CN | 106209496 | | 12/2016 | |
| CN | 106355246 | A * | 1/2017 | G06F 1/10 |
| CN | 106452671 | | 2/2017 | |
| CN | 106545955 | | 3/2017 | |
| CN | 107078808 | | 8/2017 | |
| CN | 107101348 | | 8/2017 | |
| CN | 107101348 | A * | 8/2017 | F24F 11/89 |
| CN | 107819512 | | 3/2018 | |
| CN | 108050664 | A * | 5/2018 | |
| CN | 108369670 | A * | 8/2018 | F24F 11/49 |
| CN | 108489007 | A * | 9/2018 | |
| CN | 108954754 | A * | 12/2018 | F24F 13/02 |
| CN | 109028517 | A * | 12/2018 | F24F 11/00 |
| CN | 109059233 | A * | 12/2018 | F24F 13/02 |
| CN | 109959127 | A * | 7/2019 | F24F 11/64 |
| CN | 110173809 | A * | 8/2019 | F24F 11/32 |
| CN | 110822647 | A * | 2/2020 | F24F 11/52 |
| CN | 109959127 | B * | 6/2020 | F24F 11/64 |
| CN | 110030688 | B * | 9/2020 | |
| CN | 109028517 | B * | 10/2020 | F24F 11/00 |
| CN | 109345799 | B * | 11/2020 | F24F 11/30 |
| CN | 107101348 | B * | 12/2020 | F24F 11/89 |
| CN | 112013505 | A * | 12/2020 | F24F 11/49 |
| CN | 112013506 | A * | 12/2020 | F24F 11/30 |
| CN | 110173809 | B * | 3/2021 | F24F 11/32 |
| CN | 112443949 | A * | 3/2021 | F24F 11/58 |
| CN | 112556105 | A * | 3/2021 | F24F 11/54 |
| CN | 112984718 | A * | 6/2021 | |
| CN | 109323361 | B * | 8/2021 | F24F 11/30 |
| CN | 110873419 | B * | 8/2021 | F24F 11/30 |
| CN | 112013505 | B * | 11/2021 | F24F 11/49 |
| CN | 110873417 | B * | 1/2022 | F24F 11/30 |
| CN | 113915741 | A * | 1/2022 | |
| CN | 112013506 | B * | 2/2022 | F24F 11/30 |
| CN | 114017846 | A * | 2/2022 | |
| CN | 110873407 | B * | 3/2022 | F24F 11/30 |
| CN | 110873422 | B * | 4/2022 | F24F 11/30 |
| CN | 110873426 | B * | 4/2022 | F24F 11/30 |
| DE | 60121290 | T2 * | 11/2006 | H04B 3/46 |
| EP | 3779291 | A1 * | 2/2021 | F24F 1/0003 |
| EP | 3869115 | A1 * | 8/2021 | F24F 11/30 |
| EP | 3873044 | A1 * | 9/2021 | F24F 11/49 |
| HU | 216503 | B * | 7/1999 | H04L 1/206 |
| JP | 05-244175 | | 9/1993 | |
| JP | 2007315709 | A * | 12/2007 | |
| JP | 2009012573 | A * | 1/2009 | |
| JP | 2011058720 | A * | 3/2011 | F24F 11/30 |
| JP | 2011185532 | | 9/2011 | |
| JP | 2011232013 | A * | 11/2011 | |
| JP | 2012163232 | | 8/2012 | |
| JP | 5060534 | B2 * | 10/2012 | F24F 11/30 |
| JP | 5195814 | B2 * | 5/2013 | |
| JP | 5705316 | B2 * | 4/2015 | F24F 11/30 |
| JP | 6185196 | B2 * | 8/2017 | B01D 41/00 |
| JP | 6247384 | B2 * | 12/2017 | A61B 5/00 |
| RU | 2643129 | C2 * | 1/2018 | A61B 5/00 |
| WO | WO-2005072199 | A2 * | 8/2005 | F24F 11/006 |
| WO | WO-2012172690 | A1 * | 12/2012 | F24F 11/30 |
| WO | WO-2019164677 | A1 * | 8/2019 | G05B 19/042 |
| WO | WO-2020141988 | A1 * | 7/2020 | H04L 25/0216 |
| WO | WO-2020238648 | A1 * | 12/2020 | F24F 11/30 |
| WO | WO-2020238649 | A1 * | 12/2020 | F24F 11/49 |

OTHER PUBLICATIONS

International Search Report and Written Opinion from PCT/CN2020/090426 dated Aug. 3, 2020.
Office action from Chinese Application No. 201910471269.0 dated Oct. 11, 2021.
Office action from Chinese Application No. 201910471269.0 dated Mar. 11, 2021.
Office action from European Application No. 20815617.4 dated Feb. 23, 2022.

\* cited by examiner

METHOD AND DEVICE FOR COMMUNICATION DETECTION AND AIR CONDITIONER

CROSS-REFERENCE TO RELATED APPLICATIONS

The present application is a National Stage of PCT Application No. PCT/2020/090426, filed on May 15, 2020, which claims priority to Chinese patent application No. 201910471269.0, filed on May 31, 2019, the entire contents of which are incorporated herein by reference.

TECHNICAL FIELD

The present invention relates to the technical field of air conditioners, and for example relates to a method and device for communication detection and an air conditioner.

BACKGROUND

Air conditioners include indoor units and outdoor units. For example, there are often information communication between an outdoor unit and indoor units of a multi-split air-conditioning unit. At present, the refrigerating capacity of a single module of the outdoor unit of the multi-split air-conditioning unit can reach 32 horsepower. If the four modules are combined and assembled, the refrigerating capacity of a set of outdoor unit can reach 128 horsepower, and the outdoor unit can be connected to 128 indoor units. From the perspective of development trend of the multi-split air-conditioning unit, the refrigerating capacity of the outdoor unit will continue to increase, so that one set of outdoor unit can be connected to more than 128 indoor units. The more the connected indoor units are, the longer the distance between the outdoor unit and the terminal indoor unit is.

In the process of realizing the embodiments of the present disclosure, it is found that there are at least the following problems in the related technology: in the process of communicating between the outdoor unit and the indoor units via Homebus (communication bus), as signal refraction interference is prone to occur during long-distance communication, the longer the distance between the outdoor unit and the indoor units is, the more serious the signal attenuation of Homebus communication will be, and thus, the normal communication detection between the indoor units and the outdoor unit of the multi-split air-conditioning unit cannot be guaranteed.

SUMMARY

In order to have a basic understanding of some aspects of the disclosed embodiments, a brief summary is given below. The summary is not a general comment, nor is it intended to determine key/important components or describe the protection scope of these embodiments, but serves as an introduction to the following detailed description.

The embodiments of the present disclosure provide a method and device for communication detection and an air conditioner so as to solve the problem that in the Homebus communication process in the related technology, the communication waveform attenuation occurs due to the relatively long communication distance, which results in the problem that the communication data cannot be detected normally.

In some embodiments, the method comprises: determining a length level of a communication link according to a time length of pulse data during transmission of data over the communication link; and determining a detection time point according to the length level of the communication link.

In some embodiments, the device comprises: a length level determining module, configured to determine the length level of the communication link according to the time length of pulse data during transmission of data over the communication link; and a detection time point determining module, configured to determine the detection time point according to the length level of the communication link.

In some embodiments, the air conditioner comprises: the above-mentioned device for communication detection.

Some technical solutions provided by the embodiments of the present disclosure can achieve the following technical effects:

The length level of the communication link is determined according to the time length of pulse data during transmission of data over the communication link, and then the detection time point of the data is confirmed, thereby realizing dynamic determination of the detection time point of data according to the time length of the pulse data, and data waveform attenuation caused by an excessively long distance is avoided by means of automatic adjustment of the detection time point, so that the correctness of data detection is ensured, and the stability of long-distance homebus communication is improved The above general descriptions and the descriptions hereinafter are only exemplary and explanatory, and are not used to limit the present application.

BRIEF DESCRIPTION OF THE DRAWINGS

One or more embodiments are exemplified by corresponding drawings. These exemplified descriptions and drawings do not constitute a limitation on the embodiments. Elements with the same reference numerals in the drawings are shown as similar elements. The drawings do not constitute a scale limitation, among which.

REFERENCE NUMERALS IN THE DRAWINGS

500: Air conditioner; 501: Length level determining module; 502: Detection time point determining module; 503:

Communication link length determining module; 601: Acquiring unit; 602: Judging unit; 700: Processor; 701: Memory; 702: Communication interface; 703: bus.

DETAILED DESCRIPTION

In order to have a more detailed understanding of the features and technical content of the embodiments of the present disclosure, the implementation of the embodiments of the present disclosure will be described in detail below with reference to the drawings. The attached drawings are for reference only, rather than limiting the embodiments of the present disclosure. In the following technical description, for the convenience of explanation, a number of details are used to provide a sufficient understanding of the disclosed embodiments. However, without these details, one or more embodiments can still be implemented. In other cases, in order to simplify the drawings, well-known structures and devices can be simplified for display.

Figure 1:
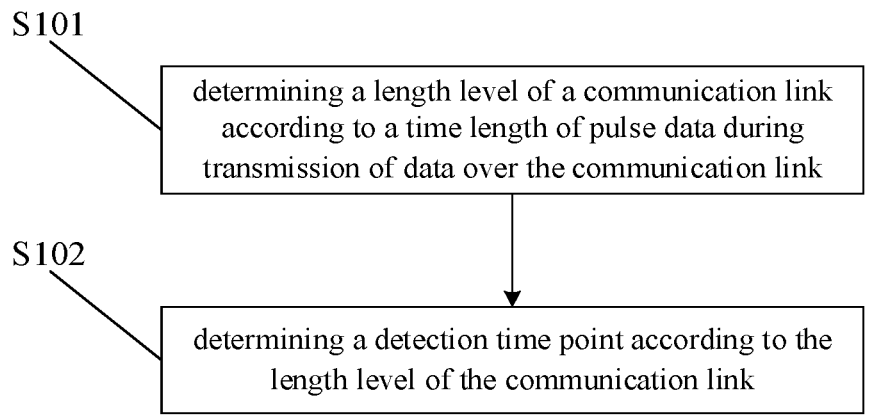
FIG. 1 is a schematic flowchart of a method for communication detection provided by an embodiment of the present disclosure.

The embodiment of the present disclosure provides a method for communication detection. As shown in FIG. 1, the method comprises:

S101. determining a length level of a communication link according to a time length of pulse data during transmission of data over a communication link; and S102. determining a detection time point according to the length level of the communication link.

After equipment is powered on, the data is received; the length level of the communication link is determined according to the time length of pulse data during transmission of data over the communication link, and then the corresponding detection time point on the communication link is determined according to the length level, thereby realizing dynamic adjustment of the location of the detection time point, and data waveform attenuation caused by an excessively long distance is avoided, so that the correctness of data detection is ensured, and the stability of long-distance homebus communication is improved. The time length of the pulse data can be the time lengths of high-level signals of the pulse data, or the time lengths of other non-zero-level signals; and the length level of the communication link is used to characterize the communication distance level of the data.

Figure 2:
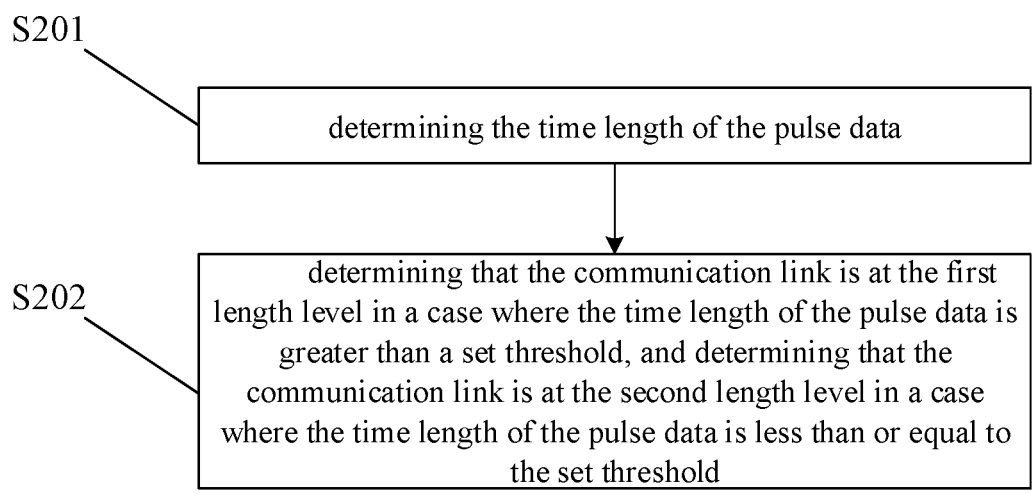
FIG. 2 is a schematic flowchart II of a method for communication detection provided by an embodiment of the present disclosure.

In some embodiments, as shown in FIG. 2, the step S101 comprises:

S201. determining the time length of the pulse data; and

S202. determining that the communication link is at the first length level in a case where the time length of the pulse data is greater than a set threshold, and determining that the communication link is at the second length level in a case where the time length of the pulse data is less than or equal to the set threshold.

Wherein the time length of the pulse data comprises the time lengths of the high-level signals of the pulse data; and the length range of the communication link corresponding to the first length level is smaller than the length range of the communication link corresponding to the second length level.

Optionally, the value of the set threshold has a corresponding relationship with the transmission speed of the communication link. Optionally, the value of the set threshold is also related to margin design, and certain margin time is added for the value range of the set threshold according to margin requirements. Optionally, the value range of the margin time is 8-12 microseconds.

Optionally, when the baud rate of the communication link is 9600, that is, 9600 bits of data are transmitted per second, then the transmission time of 1 bit of data is 104 microseconds, it can be seen that the time length of the high-level signal is at least 52 microseconds. When the time length of the high-level signal is less than 52 microseconds, the high-level signal of the data on the communication link cannot be detected correctly. For example, when the baud rate of the communication link is 9600 and the margin time is 10 microseconds, the value of the set threshold is 62 microseconds.

Optionally, in the step S201, the determining the time length of the pulse data specifically comprises:

acquiring the N high-level signals of the pulse data; and, calculating the average value of the time lengths of the N high-level signals as the time length of the pulse data, wherein N is a natural number.

Optionally, the N high-level signals can be N continuous high-level signals or N interval high-level signals.

When entering the data pulse test mode, the outdoor unit starts to send data, and the data reaches the indoor unit of the air conditioner through the communication link. After receiving the data, the indoor unit acquires the high-level signals in the pulse data, and calculates the average value of the time lengths of the N high-level signals as the time length of the pulse data. Optionally, N is the preset number of groups. For example, 10 high-level signals are obtained, and the average value of the time lengths T of the 10 high-level signals is calculated; and the average value $T_1$ of the time lengths of the high-level signals is obtained, and the length level of the communication link is determined according to the relationship between $T_1$ and the set threshold.

According to the above embodiment, that is, when $T_1$ is greater than 62 microseconds, it is determined that the communication link is at the first length level; and, when $T_1$ is less than 62 microseconds, it is determined that the communication link is at the second length level.

Wherein the length range of the communication link corresponding to the first length level is smaller than the length range of the communication link corresponding to the second length level.

In some embodiments, the length level of the communication link can also comprise more than two levels. For example, on the basis of the first length level obtained according to the set threshold provided in the present embodiment, the first length level is continuously divided into more length levels according to the transmission speed of the communication link, so as to obtain a more stable and reliable time detection point.

Figure 3:
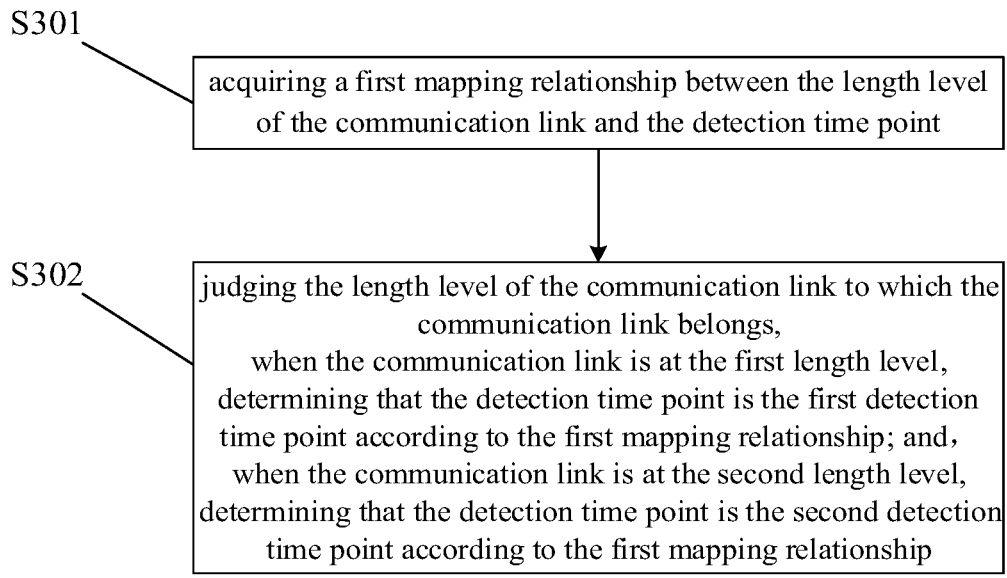
FIG. 3 is a schematic flowchart III of a method for communication detection provided by an embodiment of the present disclosure.

In some embodiments, as shown in FIG. 3, the step S102 comprises:

S301. acquiring a first mapping relationship between the length level of the communication link and the detection time point; and S302. judging the length level of the communication link to which the communication link belongs, when the communication link is at the first length level, determining that the detection time point is the first detection time point according to the first mapping relationship, and when the communication link is at the second length level, determining that the detection time point is the second detection time point according to the first mapping relationship.

Wherein the first detection time point is earlier than the second detection time point.

The detection time point of the data is determined according to the mapping relationship between the length level of the communication link and the detection time point, and thus, the dynamic determination of the detection time point is realized.

Optionally, the detection time point range corresponding to the first length level is 50-55 microseconds; and the detection time point range corresponding to the second length level is 60-65 microseconds.

Figure 4:
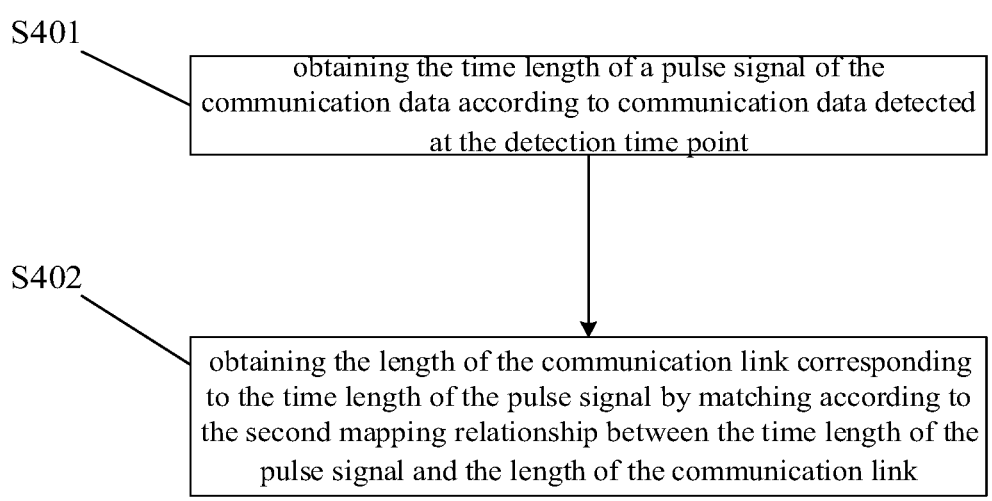
FIG. 4 is a schematic flowchart IV of a method for communication detection provided by an embodiment of the present disclosure.

In some embodiments, as shown in FIG. 4, the method further comprises:

S401. obtaining the time length of the pulse signal of the communication data according to the communication data detected at the detection time point; and S402. obtaining the length of the communication link corresponding to the time length of the pulse signal by matching according to the second mapping relationship between the time length of the pulse signal and the length of the communication link.

According to the location of the detection time point determined in the step S102, the communication distance is confirmed; and the location of the detection time point is dynamically determined, so that when the communication data is detected, the situation that the accurate data cannot be detected at the fixed detection time point due to the data waveform attenuation is avoided.

Optionally, in the step S401, the time length of the pulse signal of the communication data can be the time length of the high-level signal or low-level signal of the received one bit of data. For example, when the time length of the pulse signal of the communication data is the time length of the received one bit of high-level signal, which is 96 microseconds, the length of the communication link corresponding to the time length of the pulse signal obtained by matching according to the second mapping relationship between the time length of the pulse signal and the length of the communication link is 200 meters; and when the time length is 70 microseconds, the length of the communication link corresponding to the time length of the pulse signal obtained by matching according to the second mapping relationship is 800 meters.

There is no need to add external equipment. The matching and inference of the communication distance is carried out according to the signal condition of the data received at the detection time point, so that the data waveform attenuation caused by the excessively long distance is avoided, the accuracy of data detection is ensured, and the stability of the long-distance Homebus communication is improved.

Figure 5:
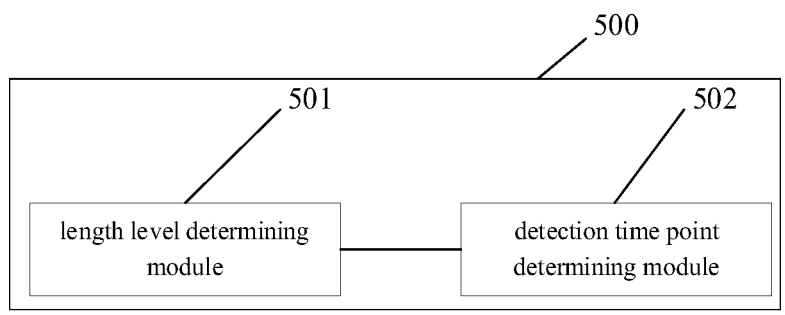
FIG. 5 is a schematic diagram of a device for communication detection provided by an embodiment of the present disclosure.

The embodiment of the present disclosure provides a device for communication detection. As shown in FIG. 5, the device for communication detection comprises:

a length level determining module 501, configured to determine the length level of the communication link according to the time length of the pulse data during transmission of data over the communication link; and a detection time point determining module 502, configured to determine the detection time point according to the length level of the communication link.

After the equipment is powered on, the data is received; the length level of the communication link is determined according to the time length of the pulse data during transmission of data over the communication link, and then the corresponding detection time point on the communication link is confirmed according to the length level, thereby realizing dynamic determination of the detection time point, and data waveform attenuation caused by the excessively long distance is avoided, so that the correctness of data detection is ensured, and the stability of long-distance homebus communication is improved. Wherein the time length of the pulse data can be the time length of the high-level signals of the pulse data, or the time lengths of other non-zero-level signals; and the length level of the communication link is used to characterize the communication distance level of the data.

In some embodiments, the length level determining module 501 is configured to:

determine the time length of the pulse data, determine that the communication link is at the first length level in a case where the effective time signal length when the data is transmitted on the communication link is greater than the set threshold, and determine that the communication link is at the second length level in a case where the effective time signal length when the data is transmitted on the communication link is less than or equal to the set threshold; and wherein the time length of the pulse data comprises the time lengths of the high-level signals of the pulse data; and the length range of the communication link corresponding to the first length level is smaller than the length range of the communication link corresponding to the second length level.

Optionally, in the length level determining module 501, the value of the set threshold has a corresponding relationship with the transmission speed of the communication link. Optionally, the value of the set threshold is also related to margin design, and certain margin time is added for the value range of the set threshold according to margin requirements. Optionally, the value range of the margin time is 8-12 microseconds.

Optionally, when the baud rate of the communication link is 9600, that is, 9600 bits of data are transmitted per second, then the transmission time of 1 bit of data is 104 microseconds, it can be seen that the time length of the high-level signal is at least 52 microseconds. When the time length of the high-level signal is less than 52 microseconds, the high-level signal of the data on the communication link cannot be detected correctly. For example, when the baud rate of the communication link is 9600 and the margin time is 10 microseconds, the value of the set threshold is 62 microseconds.

In some embodiments, the length level determining module 501 is configured to:

acquire the N high-level signals of the pulse data, and calculate the average value of the time lengths of the N high-level signals as the time length of the pulse data, wherein N is a natural number.

When entering the data pulse test mode, the outdoor unit starts to send data, and the data reaches the indoor unit of the air conditioner through the communication link. After receiving the data, the indoor unit acquires the high-level signals in the pulse data, and calculates the average value of the time lengths of the N high-level signals as the time length of the pulse data. Optionally, N is the preset number of groups. For example, the length level determining module 501 obtains the 10 high-level signals, and calculates the average value of the time lengths T of the 10 high-level signals; and the average value $T_1$ of the time lengths of the high-level signals is obtained, and the length level of the communication link is determined according to the relationship between $T_1$ and the set threshold.

According to the above embodiment, that is, when $T_1$ is greater than 62 microseconds, it is determined that the communication link is at the first length level; and when $T_1$ is less than 62 microseconds, it is determined that the communication link is at the second length level.

Wherein the length range of the communication link corresponding to the first length level is smaller than the length range of the communication link corresponding to the second length level.

In some embodiments, the length level of the communication link can also comprise more than two levels. For example, on the basis of the first length level obtained according to the set threshold, the length level determining module 501 continuously divides the first length level into more length levels according to the transmission speed of the communication link, so as to obtain a more stable and reliable time detection point.

Figure 6:
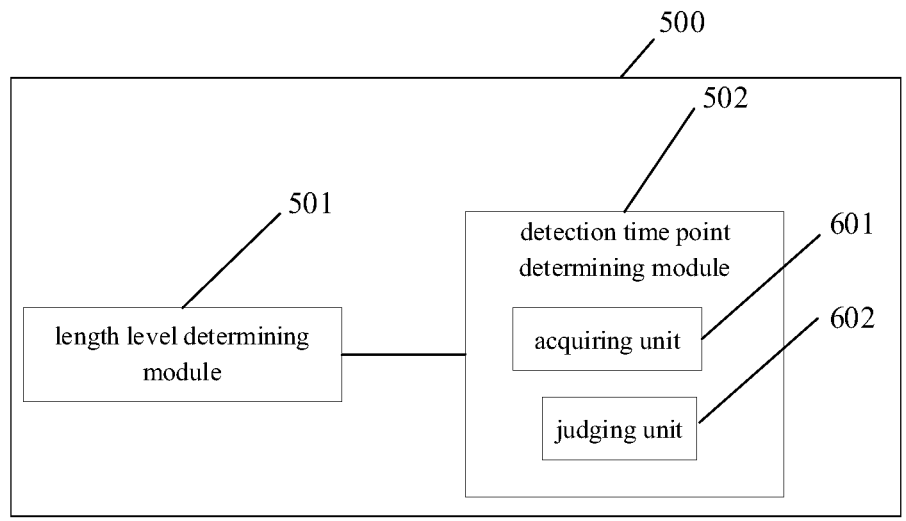
FIG. 6 is a schematic diagram II of a device for communication detection provided by an embodiment of the present disclosure.

In some embodiments, as shown in FIG. 6, the detection time point determining module 502 comprises:

an acquiring unit 601, configured to acquire the first mapping relationship between the length level of the communication link and the detection time point;

a judging unit 602, configured to judge the length level of the communication link to which the communication link belongs, determine that the detection time point is the first detection time point according to the first mapping relationship when the communication link is at the first length level, and determine that the detection time point is the second detection time point according to the first mapping relationship when the communication link is at the second length level; and wherein the first detection time point is earlier than the second detection time point.

Optionally, according to the above-mentioned embodiment, the detection time point range corresponding to the first length level is 50-55 microseconds, and the detection time point range corresponding to the second length level is 60-65 microseconds.

The detection time point of the data is determined according to the mapping relationship between the length level of the communication link and the detection time point, and thus, the dynamic determination of the detection time point is realized.

Figure 7:
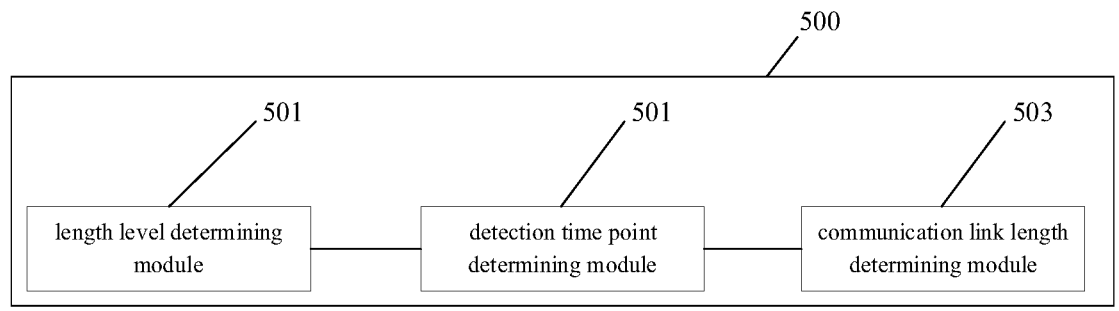
FIG. 7 is a schematic diagram III of a device for communication detection provided by an embodiment of the present disclosure.

In some embodiments, as shown in FIG. 7, on the basis of the above-mentioned embodiments, the device for communication detection further comprises a communication link length determining module 503; and the communication link length determining module 503 is configured to: obtain the time length of the pulse signal of the communication data according to the communication data detected at the detection time point, and obtain the length of the communication link corresponding to the time length of the pulse signal by matching according to the second mapping relationship between the time length of the pulse signal and the length of the communication link.

The location of the detection time point is dynamically determined, so that when the communication data is detected, the situation that the accurate data cannot be detected at the fixed detection time point due to the data waveform attenuation is avoided.

Optionally, the time length of the pulse signal of the communication data can be the time length of the high-level signal or low-level signal of the received one bit of data. For example, when the time length of the pulse signal of the communication data is the time length of the received one bit of high-level signal, which is 96 microseconds, the length of the communication link corresponding to the time length of the pulse signal obtained by matching according to the second mapping relationship between the time length of the pulse signal and the length of the communication link is 200 meters; and when the time length is 70 microseconds, the length of the communication link corresponding to the time length of the pulse signal obtained by matching according to the second mapping relationship is 800 meters.

There is no need to add external equipment. The matching and inference of the communication distance is carried out according to the signal condition of the data received at the detection time point, so that the data waveform attenuation caused by the excessively long distance is avoided, the accuracy of data detection is ensured, and the stability of long-distance Homebus communication is improved.

The device may be housed in an air conditioner 500. The embodiment of the present disclosure provides an air conditioner 500, which comprises the device for communication detection.

The embodiment of the present disclosure provides a computer-readable storage medium which stores a computer-executable instruction; and the computer-executable instruction is configured to execute the above-mentioned method for communication detection.

The embodiment of the present disclosure provides a computer program product; the computer program product comprises a computer program stored on the computer-readable storage medium; the computer program comprises a program instruction; and when the program instruction is executed by a computer, the computer is enabled to execute the above-mentioned method for communication detection.

The above-mentioned computer-readable storage medium can be a transitory computer-readable storage medium or a non-transitory computer-readable storage medium.

Figure 8:
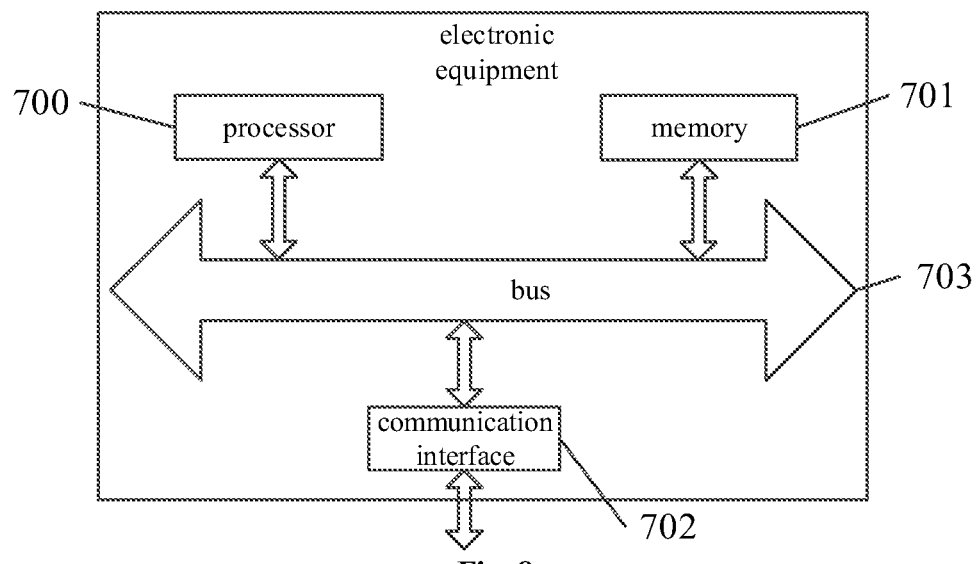
FIG. 8 is a structural schematic diagram of electronic equipment provided by an embodiment of the present disclosure.

The embodiment of the present disclosure provides electronic equipment, the structure of which is as shown in FIG. 8; and the electronic equipment comprises:

at least one processor 700, and a memory 701, and can also comprise a communication interface 702 and a bus 703, wherein in FIG. 8, one processor 700 is taken as an example, and the processor 700, the communication interface 702, and the memory 701 can communicate with each other through the bus 703. The communication interface 702 can be used for information transmission. The processor 700 can call a logic instruction in the memory 701 so as to execute the method for communication detection in the above-mentioned embodiment.

In addition, the above-mentioned logical instruction in the memory 701 can be implemented in the form of a software functional unit, and can be stored in the computer-readable storage medium when sold or used as an independent product.

As the computer-readable storage medium, the memory 701 can be used to store software programs and computer-executable programs, such as program instructions/modules corresponding to the method in the embodiment of the present disclosure. The processor 700 executes functional applications and data processing by running the software programs, instructions, and modules stored in the memory 701, that is, the method for communication detection in the above-mentioned method embodiment is realized.

The memory 701 can comprise a program storage area and a data storage area, wherein the program storage area can store an operating system and an application program required by at least one function; the data storage area can store data created according to the use of terminal equipment, and the like. In addition, the memory 701 can comprise a high-speed random access memory, and can also comprise a non-volatile memory.

The technical solutions of the embodiments of the present disclosure can be embodied in the form of a software product. The computer software product is stored in one storage medium and comprises one or more instructions used for enabling one piece of computer equipment (which can be a personal computer, a server, or network equipment, etc.) to perform all or part of the steps of the method described in the embodiment of the present disclosure. The above-mentioned storage medium can be a non-transitory storage medium, comprising: a plurality of media capable of storing program codes, such as a U disk, a mobile hard disk, a read-only memory (ROM), a random access memory (RAM), a magnetic disk or an optical disk, or can be a transitory storage medium.

The above description and drawings fully illustrate the embodiments of the present disclosure for enabling those skilled in the art to practice them. Other embodiments can include structural, logical, electrical, procedural, and other changes. The embodiments only represent possible changes. Unless explicitly required, individual components and functions are optional, and the order of operations can be changed. Parts and features of some embodiments can be included in or substitute for parts and features of other embodiments. The scope of the embodiments of the present disclosure comprises the entire scope of the claims and all available equivalents of the claims. When the terms such as "first" and "second" are used in the present application, although the terms "first" and "second" can be used for describing various elements in the present application, these elements should not be limited by these terms. These terms are only used for distinguishing one element from another element. For example, without changing the meaning of the description, the first element can be called the second element, and likewise, the second element can be called the first element, as long as all "first elements" are renamed consistently and all "second components" are renamed consistently. The first element and the second element are both elements, but they may not be the same element. Moreover, the terms used in the present application are only used for describing the embodiments and are not used for limiting the claims. As used in the description of the embodiments and claims, unless the context clearly indicates, otherwise, the singular forms "a", "an" and "the" are intended to also include plural forms. Similarly, the terms "and/or" as used in the present application refers to any and all possible combinations that include one or more of the associated lists. In addition, when used in the present application, the term "comprise" and variants thereof "comprises" and/or comprising and the like refer to the existence of stated features, wholes, steps, operations, elements, and/or components, does not exclude the existence or addition of one or more other features, wholes, steps, operations, elements, components, and/or grouping of these. If there are no more restrictions, the element defined by the sentence "comprising a . . ." does not exclude the existence of other same elements in the process, method, or equipment that comprise the element. In the present disclosure, each embodiment focuses on the differences from other embodiments, and the same or similar parts between the various embodiments can be referred to each other. For the methods, products, etc. disclosed in the embodiments, if they correspond to the method parts disclosed in the embodiments, the relevant parts can be referred to the description of the method parts.

Those skilled in the art may realize that units and algorithm steps of the examples described in combination with the embodiments disclosed herein can be implemented by electronic hardware or a combination of computer software and the electronic hardware. Whether these functions are executed by hardware or software may depend on the specific application and design constraint conditions of the technical solution. The technical personnel can use different methods for each specific application to realize the described functions, but such realization should not be considered as going beyond the scope of the embodiments of the present disclosure. The technical personnel can clearly understand that for the convenience and conciseness of the description, the specific working process of the above-described system, device, and unit can refer to the corresponding process in the above-mentioned method embodiment, which is not repeated here.

In the embodiments disclosed herein, the disclosed method and products (comprising but not limited to devices, equipment, etc.) can be implemented in other ways. For example, the device embodiments described above are merely illustrative. For example, the division of the units can only be logical function division, and there may be other division modes in actual implementation, for example, multiple units or components can be combined or can be integrated into another system, or some features can be ignored or not implemented. In addition, the displayed or discussed mutual coupling or direct coupling or communication connection can be indirect coupling or communication connection through some interfaces, devices or units, and can be in electrical, mechanical or other forms. The units described as separate components may or may not be physically separated, and the components displayed as units may or may not be physical units, that is, they may be located in one place, or they may be distributed on multiple network units. Some or all of the units may be selected according to actual needs to implement the present embodiment. In addition, the functional units in the embodiments of the present disclosure may be integrated into one processing unit, or each unit may exist alone physically, or two or more than more units may be integrated into one unit.

The flowcharts and block diagrams in the drawings show the possible implemented architecture, functions, and operations of the system, method, and computer program product according to the embodiments of the present disclosure. In this regard, each block in the flowcharts or block diagrams can represent a module, a program segment, or part of the code; and the module, program segment, or part of the code contains one or more executable instructions for realizing the specified logical function. In some alternative implementations, the functions marked in the blocks can also occur in an order different from the order marked in the drawings. For example, two consecutive blocks can actually be executed substantially in parallel, and they can sometimes be executed in the reverse order, depending on the functions involved. In the descriptions corresponding to the flowcharts and block diagrams in the drawings, the operations or steps corresponding to different blocks can also occur in an order different than the order disclosed in the description, and sometimes there is no specific order between different operations or steps. For example, two consecutive operations or steps can actually be performed substantially in parallel, and they can sometimes be performed in the reverse order, depending on the functions involved. Each block in the block diagrams and/or flowcharts, and the combination of the blocks in the block diagrams and/or flowcharts, can be implemented by a dedicated hardware-based system which performs the specified functions or actions, or can be implemented by a combination of dedicated hardware and computer instructions.

What is claimed is:

1. A method for communication detection, comprising:
   determining a length level of a communication link according to a time length of pulse data during transmission of data over the communication link; and
   determining a detection time point according to the length level of the communication link;
   wherein the determining a length level of a communication link according to a time length of pulse data during transmission of data over the communication link comprises:
   determining the time length of the pulse data;
   determining that the communication link is at the first length level in a case where the time length of the pulse data is greater than a set threshold; and
   determining that the communication link is at the second length level in a case where the time length of the pulse data is less than or equal to the set threshold;
   wherein the time length of the pulse data comprises the time lengths of high-level signals of the pulse data, and the length range of the communication link corresponding to the first length level is smaller than the length range of the communication link corresponding to the second length level.

2. The method according to claim 1, wherein the determining the time length of the pulse data specially comprises:
   acquiring the N high-level signals of the pulse data; and
   calculating the average value of the time lengths of the N high-level signals as the time length of the pulse data, wherein N is a natural number.

3. The method according to claim 2, further comprising:
   obtaining the time length of a pulse signal of the communication data according to communication data detected at the detection time point; and
   obtaining the length of the communication link corresponding to the time length of the pulse signal by matching according to a second mapping relationship between the time length of the pulse signal and the length of the communication link.

4. The method according to claim 1, further comprising:
   obtaining the time length of a pulse signal of the communication data according to communication data detected at the detection time point; and
   obtaining the length of the communication link corresponding to the time length of the pulse signal by matching according to a second mapping relationship between the time length of the pulse signal and the length of the communication link.

5. A method for communication detection, comprising:
   determining a length level of a communication link according to a time length of pulse data during transmission of data over the communication link; and
   determining a detection time point according to the length level of the communication link;
   wherein the determining a detection time point according to the length level of the communication link comprises:
   acquiring a first mapping relationship between the length level of the communication link and the detection time point;
   judging the length level of the communication link to which the communication link belongs, when the communication link is at the first length level, determining that the detection time point is the first detection time point according to the first mapping relationship, and when the communication link is at the second length level, determining that the detection time point is the second detection time point according to the first mapping relationship; and
   wherein the first detection time point is earlier than the second detection time point.

6. The method according to claim 5, further comprising:
   obtaining the time length of a pulse signal of the communication data according to communication data detected at the detection time point; and
   obtaining the length of the communication link corresponding to the time length of the pulse signal by matching according to a second mapping relationship between the time length of the pulse signal and the length of the communication link.

7. A device for communication detection, comprising:
   a length level determining module, configured to determine the length level of the communication link according to the time length of the pulse data during transmission of data over the communication link; and
   a detection time point determining module, configured to determine the detection time point according to the length level of the communication link;
   wherein the length level determining module is configured to:
   determine the time length of the pulse data,
   determine that the communication link is at the first length level in a case where the effective time signal length when the data is transmitted on the communication link is greater than the set threshold, and
   determine that the communication link is at the second length level in a case where the effective time signal length when the data is transmitted on the communication link is less than or equal to the set threshold;
   wherein the time length of the pulse data comprises the time lengths of the high-level signals of the pulse data, and the length range of the communication link corresponding to the first length level is smaller than the length range of the communication link corresponding to the second length level.

8. The device according to claim 7, wherein the length level determining module is configured to:
   acquire the N high-level signals of the pulse data, and
   calculate the average value of the time lengths of the N high-level signals as the time length of the pulse data; and
   wherein N is a natural number.

9. The device according to claim 8, wherein the detection time point determining module comprises:
   an acquiring unit, configured to acquire the first mapping relationship between the length level of the communication link and the detection time point;
   a judging unit, configured to judge the length level of the communication link to which the communication link belongs, determine that the detection time point is the first detection time point according to the first mapping relationship when the communication link is at the first length level, and determine that the detection time point is the second detection time point according to the first mapping relationship when the communication link is at the second length level; and
   wherein the first detection time point is earlier than the second detection time point.

10. The device according to claim 9, further comprising a communication link length determining module which is configured to:

obtain the time length of the pulse signal of the communication data according to communication data detected at the detection time point, and obtain the length of the communication link corresponding to the time length of the pulse signal by matching according to a second mapping relationship between the time length of the pulse signal and the length of the communication link.

11. The device according to claim 10, wherein the device is housed in an air conditioner.

12. The device according to claim 9, wherein the device is housed in an air conditioner.

13. The device according to claim 8, further comprising a communication link length determining module which is configured to:

obtain the time length of the pulse signal of the communication data according to communication data detected at the detection time point, and obtain the length of the communication link corresponding to the time length of the pulse signal by matching according to a second mapping relationship between the time length of the pulse signal and the length of the communication link.

14. The device according to claim 13, wherein the device is housed in an air conditioner.

15. The device according to claim 8, wherein the device is housed in an air conditioner.

16. The device according to claim 7, further comprising a communication link length determining module which is configured to:

obtain the time length of the pulse signal of the communication data according to communication data detected at the detection time point, and obtain the length of the communication link corresponding to the time length of the pulse signal by matching according to a second mapping relationship between the time length of the pulse signal and the length of the communication link.

17. The device according to claim 16, wherein the device is housed in an air conditioner.

18. The device according to claim 7, wherein the device is housed in an air conditioner.

* * * * *